UNITED STATES PATENT OFFICE.

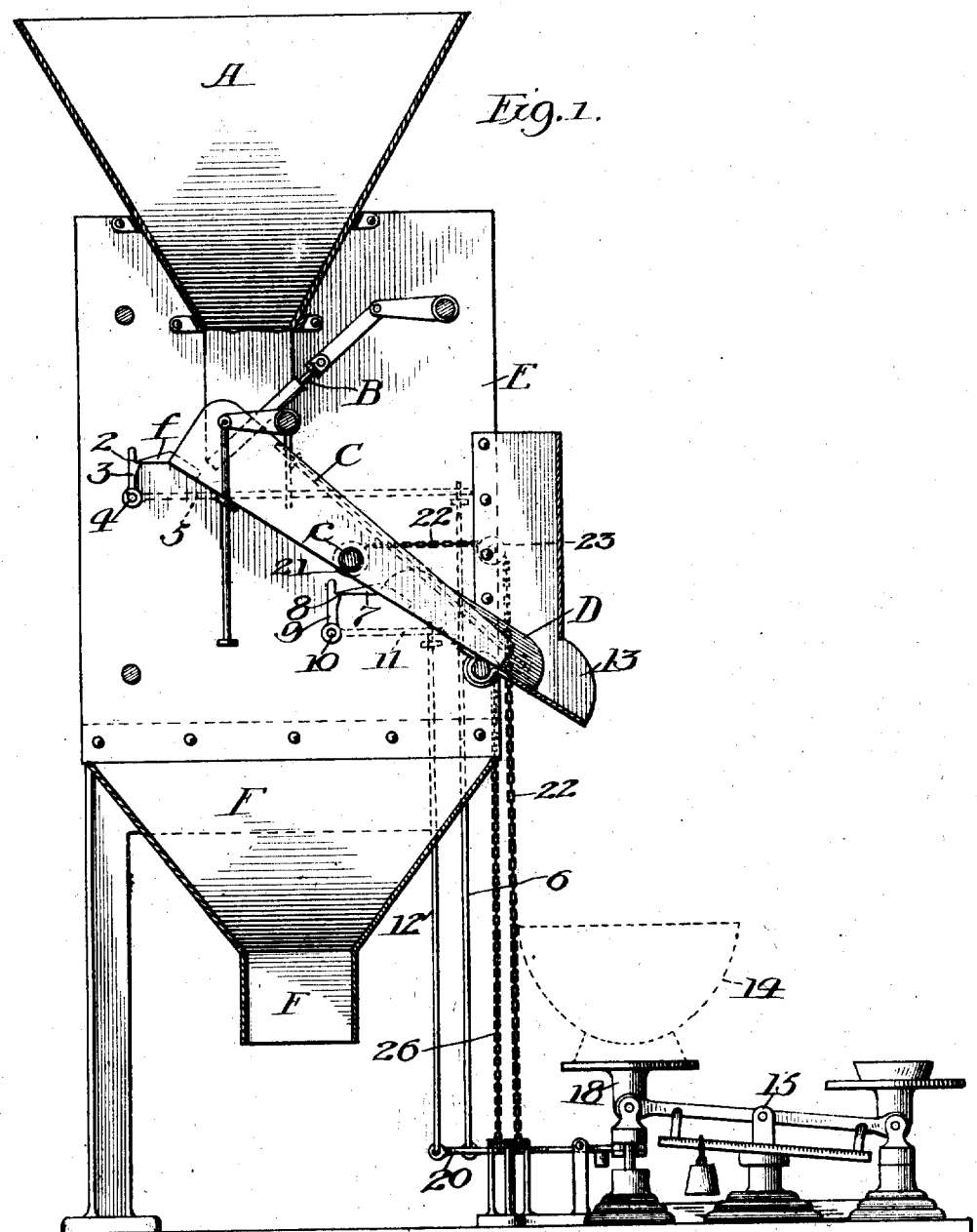

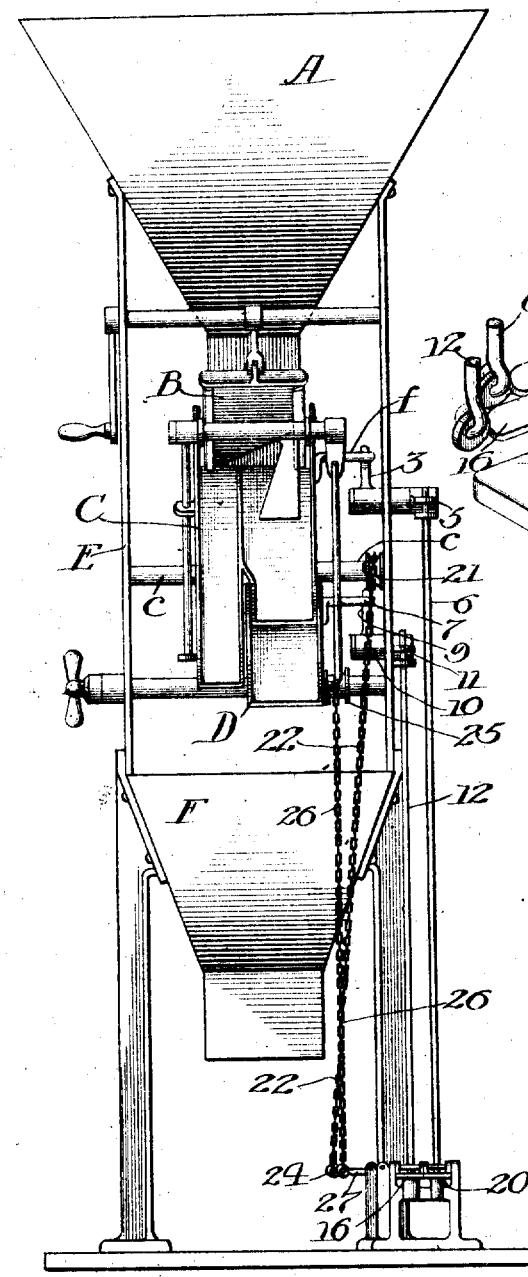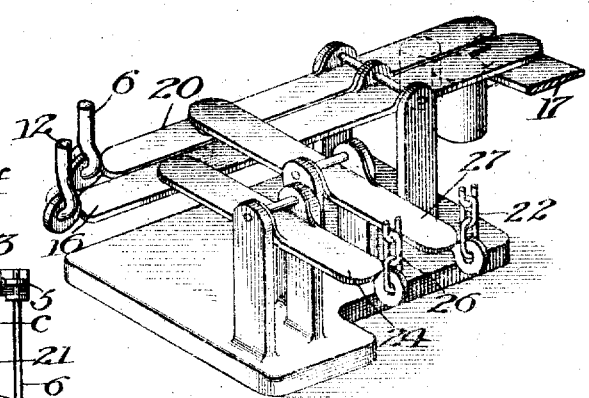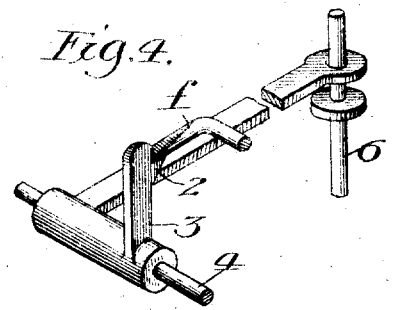

PETRONELLA EDTBAUER, OF CHICAGO, ILLINOIS.

AUTOMATIC WEIGHING APPARATUS.

No. 900,990.　　　　　Specification of Letters Patent.　　　　Patented Oct. 13, 1908.

Application filed February 6, 1908. Serial No. 414,569.

*To all whom it may concern:*

Be it known that I, PETRONELLA EDTBAUER, a citizen of the United States, and a resident of Chicago, in the county of Cook and State of Illinois, have invented certain new and useful Improvements in Automatic Weighing Apparatus, of which the following is a full, clear, and exact description.

My invention relates to automatic weighing apparatus, and particularly to that for which Letters Patent of the United States was granted to me June 18, 1907, No. 857,164.

The object of my invention is to dispense with the electrical apparatus for tilting the chutes and to perform this operation by simple and comparatively inexpensive mechanical means, that are less liable to get out of order, and are at all times capable of performing the functions assigned to them. This I accomplish by the means hereinafter fully described and as particularly pointed out in the claims.

In the drawings:—Figure 1 is a vertical longitudinal section through the weighing apparatus to which my improvements are applied. Fig. 2 is a front view of the same with the scales removed. Fig. 3 is a fragmentary view of my invention, drawn to a larger scale, showing in perspective the mechanism actuated by the scales, and employed to transmit motion to the chute supporting devices. Fig. 4 is a similar view of another part of said motion transmitting mechanism.

In the drawings A represents the hopper of the apparatus; B the longitudinally reciprocal inclined cut-off plate or valve for the discharge opening of said hopper; C the wider and longer tiltable chute, which is divided longitudinally by a suitable partition into a narrow channel and a wider channel, and has the lower end of its wider channel cut away; D represents the narrower shorter chute, so placed that the flow from the wider channel of the larger chute, falls into its upper end. The longer chute C has trunnions *c, c*, projecting laterally from its side, that are journaled in bearings in the sides, of the supporting-frame E, between whose side-walls the principal parts of my invention are assembled. The part or portion of chute C which is uppermost, when the contents of the hopper are being directed into the scales, is supported by an arm *f* secured to and projecting from its upper end, which latter has its extremity resting on a shoulder 2 of an arm 3 projecting upwards from a short rock-shaft 4 journaled in the adjacent side-wall of the supporting-frame. Outside of the side-walls of the supporting-frame a horizontal arm 5 projects forward a suitable distance from the opposite end of this rock-shaft, and the forward end of this arm 5 is engaged by a vertically disposed connecting-rod 6, as will hereinafter be more fully explained.

The upper end of the smaller chute D is similarly supported by means of an arm 7 extending from its upper end, the extremity of which is adapted to rest on the shoulder 8 of an arm 9 projecting upwards from a suitable rock-shaft 10, which latter is likewise journaled in the side-walls of the supporting-frame, and outside of said side-walls has a horizontal arm 11 projecting forward from its opposite end, the forward extremity of which is engaged by a vertically disposed connecting-rod 12, as will hereinafter more fully appear.

When the upper ends of both chutes C and D are in the position just described, they direct the flow of the commodity from the hopper, over an inclined shed 13 into the scoop or pan 14 of the scales 15, but when the support under the upper heavier ends of these chutes is withdrawn, and they tilt backwards, they discharge the flow from the hopper into a funnel F, below which any suitable receptacle for catching the excess of the hopper is placed.

My invention is concerned only with the means for supporting the upper ends of the chutes. All the remainder of the mechanism is constructed and operates, the same as the corresponding parts, described and illustrated in the aforesaid Letters Patent of the United States granted to me June 18, 1907, No. 857,164, and I make no claim specifically to the same. The lower end of the connecting-rod 6 is pivotally connected to the end of a horizontally disposed rock-bar 20, whose opposite shorter end is suitably weighted, and has its extremity normally resting upon bracket 17 projecting laterally from the lower end of the vertical column 18 forming the support for the adjacent platform of the scales 15. The lower end of the connecting-rod 12 is pivotally connected with the longer end of a rock-bar 16, which is placed parallel to rock-bar 20, and has its opposite suitably weighted and shorter arm also normally resting upon bracket 17 of the scales. The longer arm of rock-bar 16 is longer than the corresponding arm of rock-bar 20, consequently, when the platform of the scales to which bracket 17 is attached moves downwards under the weight of the commodity received by the scoop thereof, rod 12 will have a greater reciprocal movement than rod 6, and will actuate arm 9 through the medium of the horizontal arm 11 so as to withdraw its support 8 from under the upper end of the smaller chute D and cause the same, by reason of its gravity, to tilt backwards and discharge its contents into the funnel F of the apparatus. This action of chute D cuts off the flow of the commodity into the scoop of the scales, and the scoop will rise slightly until the flow of the commodity received from the narrower channel of chute C completes the weight, whereupon the scoop moves to the limit of its downward movement and imparts movement to the rock-bar 16 which moves the connecting-rod 6 upward sufficient to move arm 3 out from under the upper horizontal end of the larger chute C.

In order to remove the pressure of the weighted end of the rock-bars 16 and 20 from the bracket 17 of the scales, and permit the return of the scoop or pan of the scales to its original position, I provide the trunnions of chute C, preferably on the end extending beyond its bearings with a concave wheel 21 and secure to and extend partially around the circumference of this wheel, a chain or cord 22, which, preferably, extends forward around a concave sheave 23 and then downwards to a horizontally disposed rock-bar 27 to one end of which the lower end of the chain is secured. This rock-bar 24 is, preferably, arranged at right angles to rock-bar 16 and its opposite end laps over the longer end of rock-bar 16. In like manner the rock-bar supporting the smaller chute D is provided with a concave-wheel 25 and one end of a chain 26 extends partially around the same and from thence depends down and its lower end secured to one end of a rock-bar 27. Rock-bar 27 is, preferably, placed parallel to rock-bar 24, and it is, together with the latter, adapted to restore rock-bars to their normal positions—that is, the position they should be in when the scoop of the scales is empty, by reason of the winding of the upper ends of said chains upon the concave wheels where the chutes tilt rearwards. When this is done the weighted ends of said rock-bars 16 and 20 are lifted from bracket 17 and the opposition to the restoration of the scales to their original position removed.

What I claim as new is:—

1. In a machine of the kind specified a suitable hopper, and means for controlling the discharge opening thereof, in combination with an inclined discharge chute, a weighing scale, devices for keeping the heavier end of said discharge chute uppermost, and mechanical means that communicate the motion of said scales to said devices whereby said chute is tilted into an oppositely inclined position at the end of each weighing operation and restored to its normal position at the beginning of the next weighing operation.

2. In a machine of the kind specified a suitable hopper, and means for controlling the discharge opening thereof, in combination with two inclined discharge chutes one of which discharges into the other, a weighing scale, devices for keeping the heavier ends of said chutes uppermost independently of each other, and mechanical means that communicate the downward movement of the weighing platform of said scales to said devices whereby said chutes are successively tilted into oppositely inclined positions and restored to their normal position upon the upward movement of the weighing platform of the scales.

3. In a machine of the kind specified a suitable hopper and means for controlling the discharge opening thereof, in combination with an inclined discharge chute, a weighing scale, devices for keeping the heavier end of said chute uppermost and mechanical means for communicating the motion of said scales to said devices and permitting said chute to tilt into an oppositely inclined position and then removing the opposition to the automatic restoration of the scales to its normal position.

4. In a machine of the kind specified, a suitable hopper, and means for controlling the discharge opening thereof, in combination with two inclined discharge chutes one of which discharges into the other, a weighing scale, devices for keeping the heavier end of said chutes uppermost independently of each other, and mechanical means for successively communicating the downward movement of weighing platform of the scale to said devices and successively permitting said chutes to tilt into oppositely inclined positions and then removing the opposition to the automatic restoration of the scales to its normal position.

5. In a machine of the kind specified a suitable hopper, and means for controlling the discharge opening thereof, in combination with an inclined discharge chute, a weighing scale, devices for keeping the heavier end of said chute uppermost and mechanical means for communicating the motion of said scales to said devices and permitting said chute to tilt into an oppositely inclined position and a chain having one end wound upon the axis of said chute for removing the resistance to the automatic restoration of the scale to its normal position.

6. In a machine of the kind specified, a suitable hopper, and means for controlling the discharge opening thereof, in combination with two inclined discharge chutes one of which discharges into the other, a weighing scale, devices for keeping the heavier end of said chute uppermost independently of each other, mechanical means for communicating the downward movement of the weighing platform of the scale to said devices and successively permitting said chutes to tilt into oppositely inclined positions and chains having their ends wound upon the axes of said chutes for removing the resistance to the automatic restoration of the scale to its normal position.

7. In a machine of the kind specified, a suitable hopper, and means for controlling the discharge opening thereof, in combination with an inclined discharge chute, a weighing scale, an arm for keeping the heavier end of said chute uppermost, and mechanical means that communicate the motion of said scales to said arm whereby said chute is tilted into an oppositely inclined position at the end of each weighing operation and restored to its normal position at the beginning of the next weighing operation.

8. In a machine of the kind specified, a suitable hopper, and means for controlling the discharge opening thereof, in combination with two inclined discharge chutes one of which discharges into the other, a weighing scale, arms for keeping the heavier end of said chutes uppermost independently of each other, and mechanical means for communicating the downward movement of the weighing platform of said scales to said arms whereby said chutes are successively tilted into oppositely inclined positions and restored to their normal position at the beginning of the next weighing operation.

9. In a machine of the kind specified a suitable hopper and means for controlling the discharge opening thereof, in combination with an inclined discharge chute, a weighing scale, an arm for keeping the heavier end of said chute uppermost and mechanical means for successively communicating the motion of said scales to said arm and permitting said chute to tilt into an oppositely inclined position and then removing the opposition to the automatic restoration of the scales to its normal position.

10. In a machine of the kind specified, a suitable hopper, and means for controlling the discharge opening thereof, in combination with two inclined discharge chutes one of which discharges into the other, a weighing scale, arms for keeping the heavier end of said chutes uppermost independently of each other, and mechanical means for successively communicating the downward movement of the weighing platform of the scale to said arms and successively permitting said chutes to tilt into oppositely inclined positions and then removing the opposition to the automatic restoration of the scales to its normal position.

11. In a machine of the kind specified a suitable hopper, and means for controlling the discharge opening thereof, in combination with an inclined discharge chute, a weighing scale, an arm for keeping the heavier end of said chute uppermost and mechanical means for communicating the motion of said scales to said arm and permitting said chute to tilt into an oppositely inclined position and a chain having one end wound upon the axis of said chute for removing the resistance to the automatic restoration of the scale to its normal position.

12. In a machine of the kind specified, a suitable hopper, and means for controlling the discharge opening thereof, in combination with two inclined discharge chutes one of which discharges into the other, a weighing scale, arms for keeping the heavier end of said chutes uppermost independently of each other, mechanical means for communicating the downward movement of the weighing platform of the scale to said arms and successively permitting said chutes to tilt into oppositely inclined positions and chains having their ends wound upon the axes of said chutes for removing the resistance to the automatic restoration of the scale to its normal position.

13. In a machine of the kind specified a suitable hopper, and means for controlling the discharge opening thereof, in combination with an inclined discharge chute, a weighing scale, an arm for keeping the heavier end of said chute uppermost and an arm extending at an angle to said last mentioned arm, a connecting rod and a rock-bar for communicating the motion of said scales to said arm and permitting said chute to tilt into an oppositely inclined position.

14. In a machine of the kind specified a suitable hopper, and means for controlling the discharge opening thereof, in combination with two inclined discharge chutes one of which discharges into the other, a weighing scale, arms for keeping the heavier end of said chutes uppermost independently of each other, and arms extending forward at an angle to said last mentioned arms, connecting-rods and rock-bars for communicating the downward movement of the weighing platform of the scale to said arms and successively permitting said chutes to tilt into oppositely inclined positions.

15. In a machine of the kind specified a suitable hopper and means for controlling the discharge opening thereof, in combination with an inclined discharge chute, a weighing scale, an arm for keeping the heavier end of said chute uppermost and an arm extending at an angle to said last mentioned arm, a connecting-rod and a rock-bar for successively communicating the motion of said scales to said arm and permitting said chute to tilt into an oppositely inclined 16. In a machine of the kind specified, a suitable hopper, and means for controlling the discharge opening thereof, in combination with two inclined discharge chutes one of which discharges into the other, a weighing scale, arms for keeping the heavier end of said chutes uppermost independently of each other, and arms extending forward at an angle to said last mentioned arms, connecting-rods and rock-bars for successively communicating the downward movement of the weighing platform of the scale to said arms and successively permitting said chutes to tilt into oppositely inclined positions and then removing the opposition to the automatic restoration of the scales to its normal position.

17. In a machine of the kind specified a suitable hopper, and means for controlling the discharge opening thereof, in combination with an inclined discharge chute, a weighing scale, an arm for keeping the heavier end of said chute uppermost and an arm extending at an angle to said last mentioned arm, a connecting rod and a rock-bar for communicating the motion of said scales to said arm and permitting said chute to tilt into an oppositely inclined position and a chain having one end wound upon the axis of said chute for removing the resistance to the automatic restoration of the scale to its normal position.

18. In a machine of the kind specified, a suitable hopper, and means for controlling the discharge opening thereof, in combination with two inclined discharge chutes one of which discharges into the other, a weighing scale, arms for keeping the heavier end of said chutes uppermost independently of each other, arms extending forward at an angle to said last mentioned arms, connecting-rods and rock-bars for communicating the downward movement of the weighing platform of the scale to said arms and successively permitting said chutes to tilt into oppositely inclined positions and chains having their ends wound upon the axes of said chutes for removing the resistance to the automatic restoration of the scale to its normal position.

19. In a machine of the kind specified a suitable hopper, and means for controlling the discharge opening thereof, in combination with an inclined discharge chute, a weighing scale, devices for keeping the heavier end of said chute uppermost and mechanical means for communicating the motion of said scales to said devices and permitting said chute to tilt into an oppositely inclined position and a chain having one end wound upon the axis of said chute and a rock-bar to which its other end is secured for removing the resistance to the automatic restoration of the scale to its normal position.

20. In a machine of the kind specified, a suitable hopper and means for controlling the discharge opening thereof, in combination with two inclined discharge chutes one of which discharges into the other, a weighing scale, devices for keeping the heavier end of said chutes uppermost independently of each other, mechanical means for communicating the downward movement of the weighing platform of the scale to said devices and successively permitting said chutes to tilt into oppositely inclined positions and chains having their ends wound upon the axes of said chutes and rock-bars to which the other ends thereof are secured for removing the resistance to the automatic restoration of the scale to its normal position.

21. In a machine of the kind specified a suitable hopper, and means for controlling the discharge opening thereof, in combination with an inclined discharge chute, a weighing scale, an arm for keeping the heavier end of said chute uppermost and mechanical means for communicating the motion of said scales to said arm and causing said chute to tilt into an oppositely inclined position and a chain having one end wound upon the axis of said chute and a rock-bar to which its other end is secured for removing the resistance to the automatic restoration of the scale to its normal position.

22. In a machine of the kind specified a suitable hopper, and means for controlling the discharge opening thereof, in combination with two inclined discharge chutes one of which discharges into the other, a weighing scale, arms for keeping the heavier end of said chutes uppermost independently of each other, mechanical means for communicating the downward movement of the weighing platform of the scale to said arms and successively permitting said chutes to tilt into oppositely inclined positions and chains having their ends wound upon the axes of said chutes and rock-bars to which the other ends thereof are secured for removing the resistance to the automatic restoration of the scale to its normal position.

In testimony whereof I have hereunto set my hand and seal this 1st day of February, A. D., 1908.

PETRONELLA EDTBAUER. [L. S.]

Witnesses:
FRANK D. THOMASON,
E. K. LUNDY.